United States Patent [19]

Abramson

[11] Patent Number: 4,931,770
[45] Date of Patent: Jun. 5, 1990

[54] PROTECTION SYSTEM

[75] Inventor: Monte Abramson, Flushing, N.Y.

[73] Assignee: Southern Integrity, Inc., Palm Beach, Fla.

[21] Appl. No.: 325,659

[22] Filed: Mar. 20, 1989

Related U.S. Application Data

[63] Continuation-in-part of Ser. No. 104,806, Oct. 1, 1987, Pat. No. 4,814,749.

[51] Int. Cl.⁵ ............................................. G08B 13/00
[52] U.S. Cl. ..................... 340/541; 241/36; 340/568; 360/66
[58] Field of Search ............... 340/541, 545, 548, 668, 340/568, 571, 574; 200/61.18, 61.19; 109/38–44, 23, 29; 241/36, 30, 301; 360/66; 206/387, 807; 235/382

[56] References Cited

U.S. PATENT DOCUMENTS

| | | | |
|---|---|---|---|
| 4,236,463 | 12/1980 | Westcott | 109/44 X |
| 4,325,089 | 4/1982 | Hsu | 360/66 X |
| 4,479,579 | 10/1984 | Miklos | 206/807 X |
| 4,532,566 | 7/1985 | Horimoto | 206/807 X |
| 4,549,658 | 10/1985 | Sifkas | 206/807 X |
| 4,567,983 | 2/1986 | Morris | 206/387 |
| 4,572,369 | 2/1986 | Morris | 206/387 |
| 4,615,490 | 10/1986 | Goldhammer | 241/36 |
| 4,664,317 | 5/1987 | Morton | 241/36 |
| 4,767,564 | 8/1988 | Kitchens et al. | 252/187.26 |
| 4,804,826 | 2/1989 | Hertzen et al. | 235/382 |
| 4,814,749 | 3/1989 | Abramson | 340/541 |

Primary Examiner—Joseph A. Orsino
Assistant Examiner—Thomas J. Mullen, Jr.
Attorney, Agent, or Firm—Steele, Gould & Fried

[57] ABSTRACT

A system for transferring information stored on a disc, tape or film is provided which prevents unauthorized or unintentional use or disclosure to third parties of the information contained on the disc, tape or film. The disc, tape or film is contained within a cassette having structure for sensing intrusion into the cassette. The sensing structure triggers a destructive device which destroys the information on the disc, tape or film when intrusion into the cassette is sensed.

18 Claims, 6 Drawing Sheets

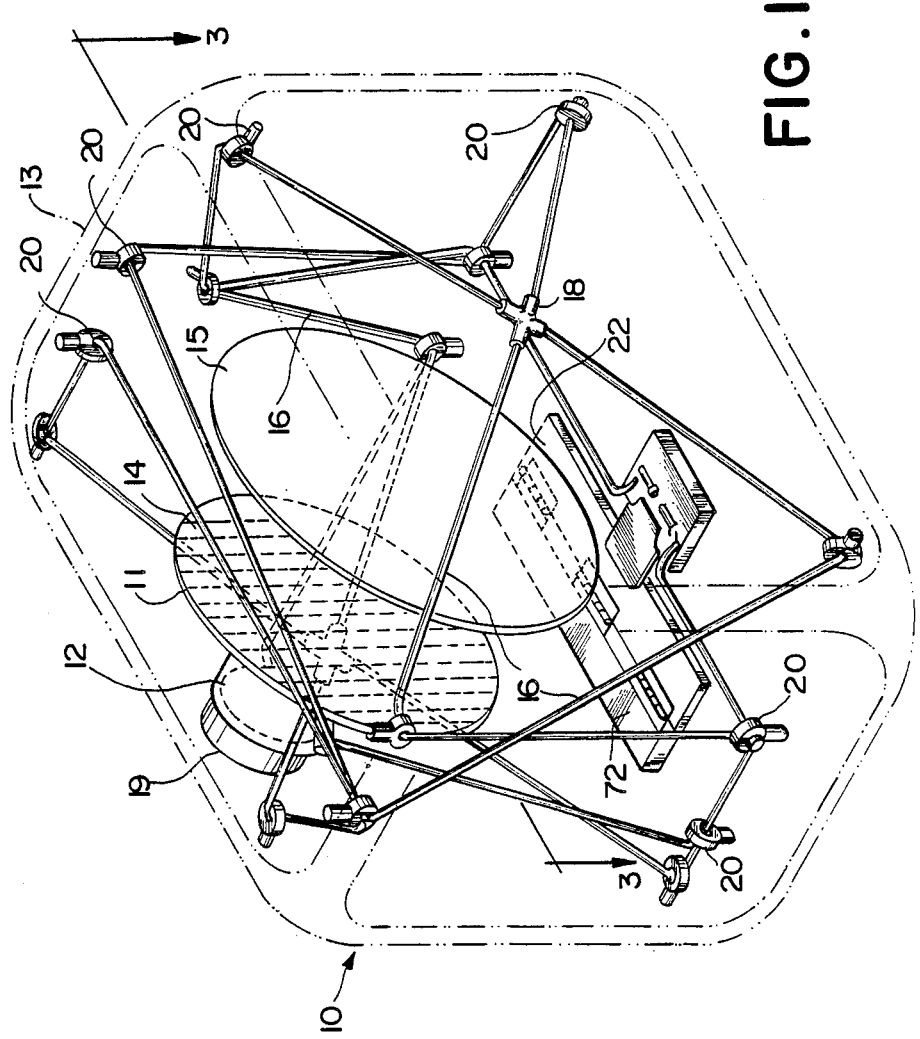

PROTECTION SYSTEM

CROSS REFERENCE TO THE RELATED APPLICATION

This application is a continuation-in-part of the Applicant's co-pending U.S. patent application Ser. No. 104,806, filed Oct 1, 1987, now U.S. Pat. No. 4,814,749.

FIELD OF THE INVENTION

The invention relates to a novel arrangement for destroying audio and/or visual discs, tapes and/or film in a transporter, projector or information retrieval system so as to prevent the unauthorized disclosure of information. More particularly, the invention is concerned with a means for destroying information storage discs, audio and/or visual discs in cassettes or disclosure systems to prevent their theft.

BACKGROUND OF THE INVENTION

Governments and industries have need for securing audio and/or visual recordings which contain proprietary or secret information during transportation and storage. Laser discs and magnetic recording discs in many industries now contain trade secrets which provide a company its competitive edge.

It is now common in governments and industries utilizing a security system to use a flexible magnetic disc on which information useful to a computer system may be magnetically recorded. Such discs permit the computer to access information directly through the disc drive, thus eliminating the necessity of the user entering such information manually. Such prerecorded information is commonly referred to as "software" and, with the advent of inexpensive computers, the sale of such software has evolved into a significant business. Software packages, which include one or a number of such prerecorded discs, have proven extremely popular and are the subject of great competition. Primarily, the cost of software packages is determined by the perceived value of the information provided on the disc rather than the cost of either manufacturing the disc and the jacket or that of recording the information. Unfortunately, information is easily duplicated from one disc to another. The combination of inexpensive discs and partially assembled jackets and readily available means for duplicating recorded information has spawned a large illicit market in the unauthorized duplication and sale of software packages which are not readily distinguishable from authorized counterparts.

The illicit copying of information is also widespread in the entertainment industry. Very large revenues are lost each year by the music, movie, and video industries through the unauthorized copying and distribution of records, tapes, videotapes, and broadcasts. Recent improvements in electronic recording technology are likely to encourage still more unauthorized duplication.

It is now known to provide ignition systems which burn or char the contents of cassettes to prevent their unauthorized use or copying. Such systems can be dangerous since fires may occur which cause injury to innocent bystanders and which damages the cassette. Other systems have utilized explosive devices which also can be dangerous.

OBJECTS AND SUMMARY OF THE INVENTION

It is an object of the present invention to provide a means for preventing unauthorized access to information on computer, audio and/or visual discs in transporters, projectors, cassettes or computers.

It is a further object of the invention to provide a means for securing a projector having a disc cassette, or a computer with a disc programming unit, against intrusion and/or unauthorized use.

It is a still further object of the invention to provide a security device for a projector having a disc cassette which is inexpensive to manufacture, efficient in operation and does not cause injury to any person.

These and other objects can be accomplished by providing information storage and retrieval systems such as projection and computer systems which utilize a recorded disc, tape or film housed within a protective cassette having means for destroying information on the disc, tape, film upon the sensing of forced entry or tampering. More specifically, there is provided means for sensing an intrusion into the cassette and means responsive to said sensed intrusion for destroying the information on the disc, tape or film.

In a preferred embodiment of the invention, the means for destroying information on the disc, tape or film comprises a movable means which is provided with a destructive member. The destructive member can include an abrasive, cutting, chemical, magnetic, or other suitable component adapted to destroy information on the disc, tape or film when placed in contact or destructive proximity to the disc, tape or film. In the event of tampering or intrusion, an impact sensor activates the movable member, places the destructive member in contact with the disc and destroys information on the disc so that it cannot be used or duplicated.

Other objects and a fuller understanding of the invention will be had by referring to the following description and claims of a preferred embodiment, taken in conjunction with the accompanying drawings, wherein like reference characters refer to similar parts throughout the several views.

BRIEF DESCRIPTION OF THE DRAWINGS

FIG. 1 is an elevation, partly in section disclosing the intrusion sensors, and destructive mechanism of the invention;

DESCRIPTION OF THE PREFERRED EMBODIMENT OF THE INVENTION

Figure 2A:
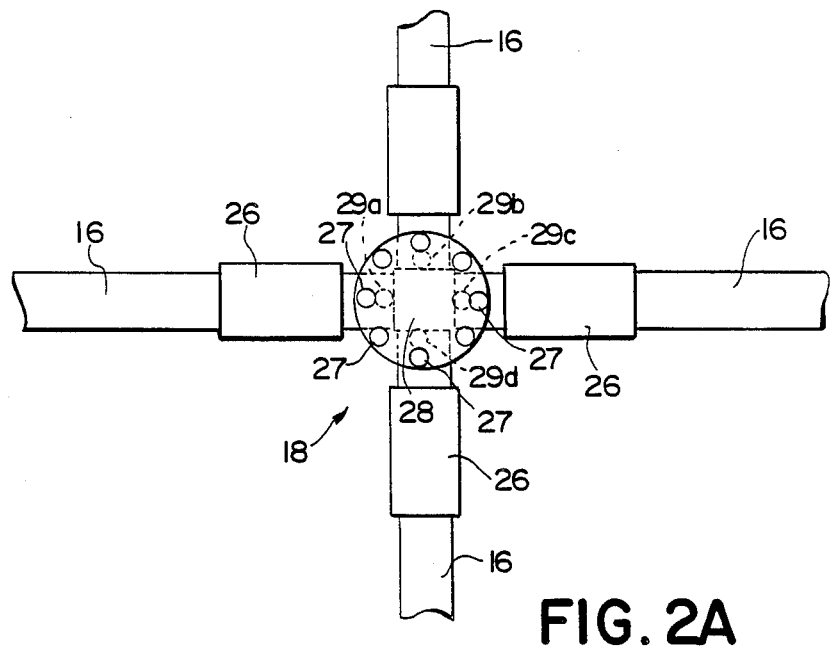
FIGS. 2A and 2B are side elevations partly in section of the impact sensor of FIG. 1.

Although specific terms are used in the following description for the sake of clarity, these terms are intended to refer only to the particular structure of the invention selected for illustration in the drawings, and are not intended to define or limft the scope of the invention. Aspects of the invention are disclosed in Applicant's co-pending U.S. application Ser. No. 104,806, to be U.S. Pat. No. 4,814,749, the disclosure of which is incorporated fully by reference.

Figure 2B:
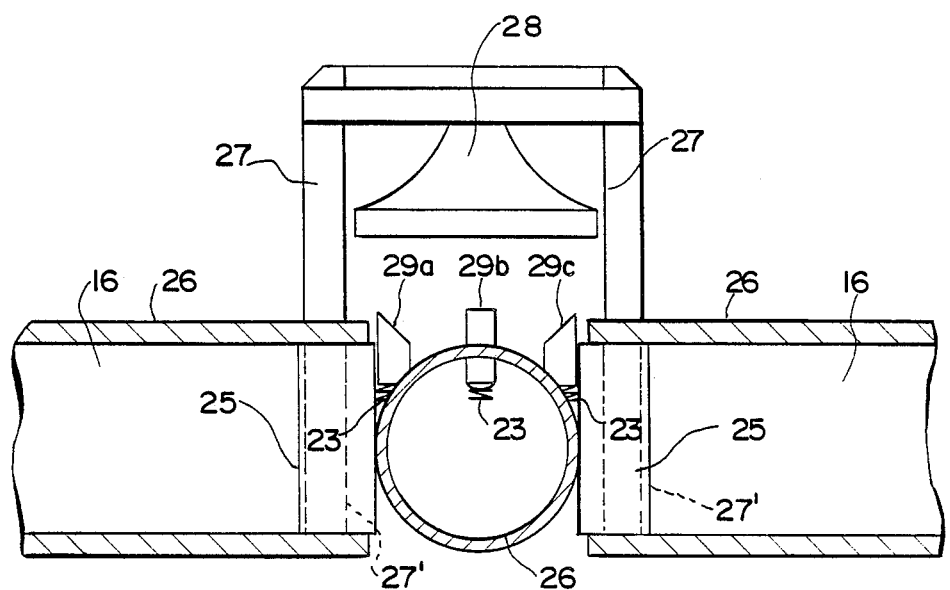
Figure 3:
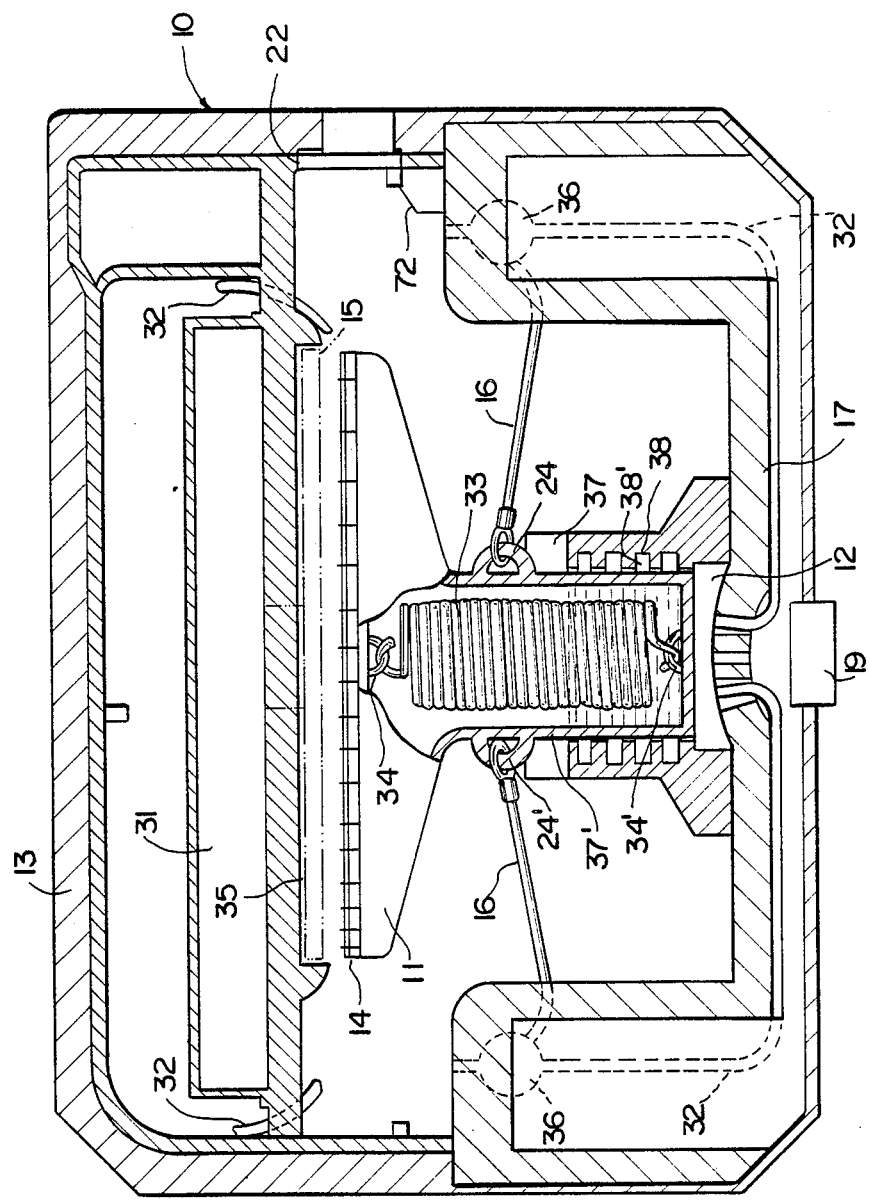
FIG. 3 is a side view partly in section showing the device of FIG. 1 is a cassette form.

As seen in FIGS. 1-3, the essential components of the security device 10 of the invention comprise a rotatable table 11 mounted on a motor means 12 which is fixed to an inner surface 17 within a housing 13. On the face of the table 11 is attached a destructive member such as the abrasive disc 14. The abrasive disc 14 is mounted adjacent an information storage disc 15 which contains the information to be played and for which the security is intended.

About the inside of the device 10 passes a line or lines 16 under tension. The line 16 is connected through a release mechanism 18 and, after passage about the device 10 through line guides 20, to connectors 24, 24, on the table 11. The line 16 retains the table 11 from contacting the disc 15 and prevents rotation of the table 11.

In operation, the disc 15 is placed into the device 10 through a suitable access means such as the spring biased door 22 into a suitable disc holder. The restraining means provided is constant while the information storage disc is placed within the housing 13. Any tampering or intrusion into the device 10 will cause the release of the line 16 from release 18. The release of the line 16 in turn frees the motor means 12 to rotate and extend the table 11 into contact with the disc 15 so as to destroy the disc through the rotation.

In FIG. 2A there is shown an impact sensor comprising four-way release mechanism 18. The invention will be described with reference to a four-way release, although other releases, particularly two-way and three-way releases are also contemplated. The release mechanism 18 connects the line 16 in a line locking head 26 of the mechanism 18.

As seen in FIG. 2B, the line 16 has end members 25 of metal or plastic which permits easy insertion of the line 16 into the locking head 26. The end members 25 also provide a surface for mounting the plungers 29a, 29b, 29c and 29d in FIG. 2A which releasably lock the taut end members 25 within the locking heads 26. An anvil 28 may be fastened to guide posts 27 (shown in FIG. 2B) slidably mounted within guide channels 27' (phantom lines). The anvil 28 can be secured directly to a wall of the housing such that inward movement of the wall drives the anvil into the plungers 29. Alternatively, the anvil 28 could be connected to a gravity actuated member which falls when outer housing layers are removed to carry the anvil 28 into the plungers 29a-d. The anvil 28 acts on the plungers 29a-d when a wall of the housing is moved, for example, by attempted intrusion with an impact tool such as a hammer. The plungers 29a-d are normally extended by springs 23 and are driven down by the anvil 28 as a result of the attempted penetration into the housing. Downward movement of the plungers 29a-d releases the line 16 from the locking heads 26.

The security device 10 of the invention is preferably in the form shown in FIGS. 1 and 3. The cassette 10 comprises a housing 13 having a door 22 for inserting a disc 15 into a suitable disc holder 35 for reading by a reading head in housing 31. It is possible to omit the door 22 where access by an external reader is not necessary. Throughout the cassette 10 are guide channels 32 through which pass the line 16. The cassette 10 has housings 36 for the release mechanisms 18 at various locations.

The abrasive or cutting disc 14 is attached to the rotatable table 11. The table 11 is connected by a connector 34 to a spring 33 and a motor means 12. The motor means 12 is connected by a connector 34' to the spring 33. The spring 33 is preferably provided within a spring housing 37, which has an aperture (not shown) to accommodate the connector 34, It can be seen that the spring 33 is restrained from rotation by connection of the line 16 to the connectors 24, 24' which are preferably fixed to the spring housing 37'. The spring housing 37' can be threadably engaged to a spring support 37 by means of male threads 38' on the spring housing 37' which engage cooperating female threads 38 on the spring support 37. An electrical contact 19 when connected to an electrical energy source provides the power for an optional internal disc reading head, disc spinning player, motor 12, access door control 72 and bridging element.

The operation of the release mechanism is seen as follows. The line 16 retains the table 11 against movement which otherwise would be caused by the spring 33. The line 16 is thereby under a degree of tension due to the action of this spring 33. The plungers 29a-d retain the end members 25 of the line 16 within the locking heads 26. The line is connected through the release mechanism 18 to the table 11. Attempted intrusion into the housing 13 will cause the anvil 28 to be driven into the plungers 29a-d. Movement of the plungers 29a-d will permit the end members 25 of the line 16 to pass through the locking heads 26 and thereby release the table 11 to move under the influence of spring 33 into the disc 15. The motor 12 can alternatively be utilized to rotate and extend the table 11 into contact with the disc 15. The spring 33 is the preferred embodiment, although other motor means 12 could be used for this purpose. The spring 33 and the spring housing 37' are permitted to advance when the line 16 is released. The threads 38, 38' will cause the spring housing 37' and table to rotate and advance in the manner of a screw.

Figure 4:
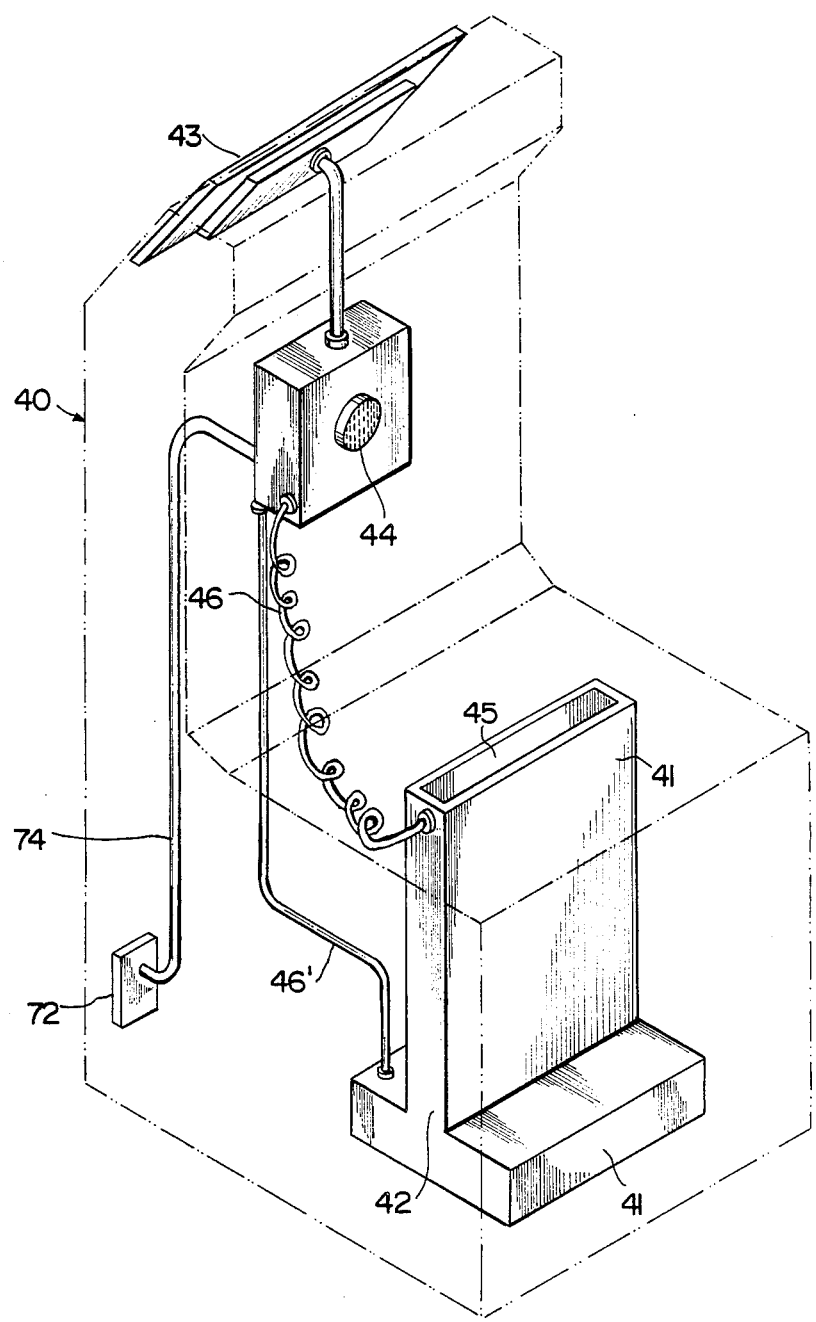
FIG. 4 is a perspective view, partly in phantom showing a disc loader for the device of FIG. 3.

In FIG. 4 there is illustrated a module 40 for inserting the disc 15 into the cassette 10. The cassette 10 is connected at member 19 with a male I.D. control 44 on the module 40. The door 22 of the cassette 10 is in alignment with a disc holder 41 that contains a telescoping means 45. The telescoping means 45 extends the disc 1 through the door 22 into the disc holder 35 of the cassette 30. A control line 46 can be provided to control the telescoping means 45. A power line 46' is attached to a side 42 of the disc holder 41 and delivers electrical power from the I.D. control 44, which is connected to a control panel 43 and the telescoping means 45. A power supply line 74 can be provided with a suitable electrical connector 72 for connection to an external power supply.

Figure 5:
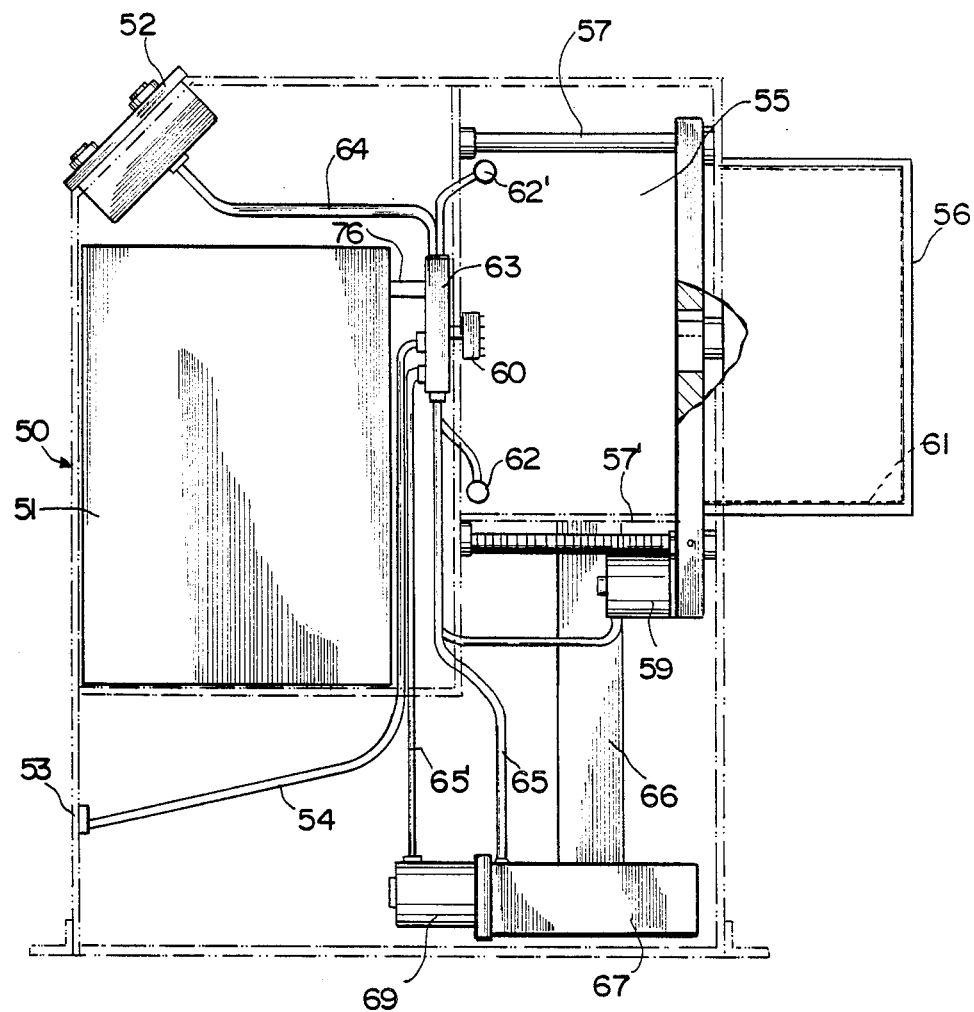
FIG. 5 is a cross section in part of a projector which utilizes the cassette of FIG. 3.

The projector module 50 shown in FIG. 5 is adapted to contain a conventional projecting or playing means (not shown) for the disc 15. The projecting means is placed within the projector housing 51 of module 50. The cassette 10 shown in FIG. 3 is placed in a drawer 56 of the module 50 and then moved into the module 50 along tracks 57, 57'. The drawer 56 is driven along the tracks 57, 57' by a motor 59 until it places the cassette 10 into an operating condition by connection of the contact 19 with the module control connector 60. The drawer 56 is advantageously provided with electrical lines 61 which are placed into contact with contactor points 62, 62' upon the closing of the drawer 56. A program line 76 carries information from a cassette in the drawer 56 to the projector module 50.

The operation of the module 50 is controlled through a control panel 52 that is connected to a control center 63 by a line 64. Control panel 52 is also connected to a power connector 53 through line 54.

A reading head may be provided in the cassette 10 to retrieve information from the disc, tape or film and to transfer this information to the contact 19, and through the module control connector 60 to the projector module 51. Optionally, there may also be provided a further reading head (not shown) within the well 66. Movement of such a reading head into a cassette positioned in the drawer 56 can be accomplished by a motor 67, which can be powered by a motor control line 65. In order to prevent inactivation by cutting off the power source from line 54, an auxiliary power source such as battery 69 is provided. The battery 69 is connected to the control center 63 through line 65'.

Figure 6:
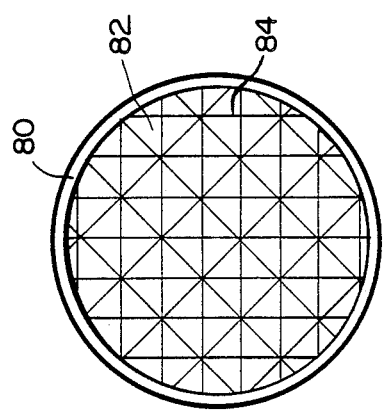
FIG. 6 is an elevation of a first alternative destructive member.

The present embodiment has been disclosed as utilizing an abrasive or cutting disc 14. It is also possible to use alternative means for destroying information on the disc, tape or film when the table 11 is driven into destructive contact with or proximity to the disc 15. A first alternative destructive member is shown in FIG. 6. The destructive member 80 is attachable to the table 11 and bears a number of frangible storage cells 82 containing a destructive chemical compound such as an acid. The cells 82 are sufficiently frangible to break and release the chemical compound onto the information disc 15 when the table 11 is driven into the disc 15. The chemical composition will destroy the information on the disc in order to prevent unauthorized retrieval of this information. The cells 82 can be formed by a number of seams 84 which can be any suitable process. The material used to form the cells 82 can be formed by any suitable material which is resistant to chemical degradation by the chemical stored within.

Figure 7:
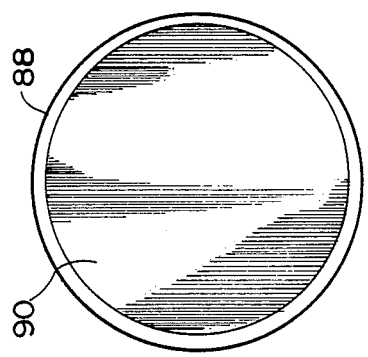
FIG. 7 is an elevation of a second alternative destructive member.

A second alternative destructive member is shown in FIG. 7. The destructive member 88 comprises a magnetic head 90. The magnetized head 90 is adapted to destroy magnetic information stored on magnetic discs or tapes. It is apparent that the magnetic head 90 need not be placed in actual physical contact with the disc or tape, rather only in sufficient proximity as to allow the magnetic field to destroy the information on the disc or tape.

The invention has been described in particular as applicable to information discs, such as the disc 15. It is apparent, however, that the concepts disclosed herein are equally applicable to information tapes as well as other alternative information storage media. The sensors used to sense intrusion and actuate destruction of the information can take alternative forms, although the anvil-line release mechanism disclosed herein is presently preferred. It also would be possible to provide electronic sensing and release mechanisms. The table 11 is preferably rotatable in the manner shown and described although it is apparent that effective destructive movement could take alternate forms. Further, the invention can be manufactured from several alternative materials, although shock-resistant plastics and metals are presently preferred.

Although the invention has been described with a certain degree of particularity, it is understood that the present disclosure has been made only by way of example and that numerous changes in the details of construction and combination and arrangement of parts may be resorted to without departing from the spirit and scope of the invention.

I claim:

1. In an audio and/or video system for transferring information stored on a disc, tape or film, the improvement comprising a cassette means for preventing the unauthorized or unintentional disclosure of said information on said disc, tape or film by intrusion into said cassette means, said cassette means being provided with access means for authorized retrieval of said information on said disc, tape or film, by an information processing device means for sensing unauthorized intrusion into said cassette means, an information destroying means, and means for moving said information destroying means into destructive contact with said disc, tape or film, when said means for sensing intrusion senses intrusion into said cassette means.

2. The system of claim 1, wherein said means for moving said information destroying means comprises spring operated means.

3. The system of claim 2, wherein said sensing means is an impact responsive means.

4. The system of claim 3, wherein said impact responsive means comprises a line extending within said cassette means, and line connector means adapted to release said line upon impact whereby the information destroying means is activated.

5. The system of claim 4, wherein said line is held taut by said spring operated information destroying means.

6. The system of claim 1, wherein said means for moving said information destroying means comprises motor means.

7. The system of claim 1, wherein said cassette means comprises door means for inserting said disc, tape or film within said cassette means.

8. The system of claim 7, wherein said door means are adapted to receive guidance means for inserting said disc, tape or film into said cassette means.

9. The system of claim 8, further comprising information retrieval means adapted for entry into said cassette means through said door means and for retrieving information stored on said disc, tape or film.

10. The system of claim 9, wherein said information retrieval means comprises an auxiliary power source.

11. The system of claim 9, wherein said cassette means includes a spring operated means for placing said information destroying means in contact with said disc, tape or film.

12. The system of claim 1, wherein said moving means is held from movement by an impact responsive means.

13. The system of claim 12, wherein said impact responsive means comprises a line extending within said cassette means and line connector means adapted to release said line upon impact.

14. The system of claim 13, wherein said line is held taut by said moving means.

15. The system of claim 1, wherein said information destroying means comprises an abrasive or cutting means.

16. The system of claim 1, wherein said information destroying means comprises a chemically-reactive means.

17. The system of claim 1, wherein said information destroying means comprises magnetic means adapted to destroy magnetically-stored information on said disc, tape or film.

18. The system of claim 1, wherein said cassette means is adapted for insertion into said information processing device.

* * * * *